Jan. 3, 1956 F. R. MILSOM 2,729,779

MOTOR CONTROL SYSTEM UTILIZING MAGNETIC AMPLIFIERS

Filed Dec. 12, 1950 2 Sheets-Sheet 1

INVENTOR
FREDERICK ROGER MILSOM

BY Moore and Hall
ATTORNEYS

Jan. 3, 1956 F. R. MILSOM 2,729,779

MOTOR CONTROL SYSTEM UTILIZING MAGNETIC AMPLIFIERS

Filed Dec. 12, 1950 2 Sheets-Sheet 2

INVENTOR
FREDERICK ROGER MILSOM

BY Moore and Hall

ATTORNEYS

United States Patent Office 2,729,779 Patented Jan. 3, 1956

2,729,779

MOTOR CONTROL SYSTEM UTILIZING MAGNETIC AMPLIFIERS

Frederick Roger Milsom, Cheltenham, Glos, England, assignor to S. Smith & Sons (England) Limited, London, and Furzehill Laboratories, Herts, England Application December 12, 1950, Serial No. 200,350

4 Claims. (Cl. 318—327)

Figure 1:
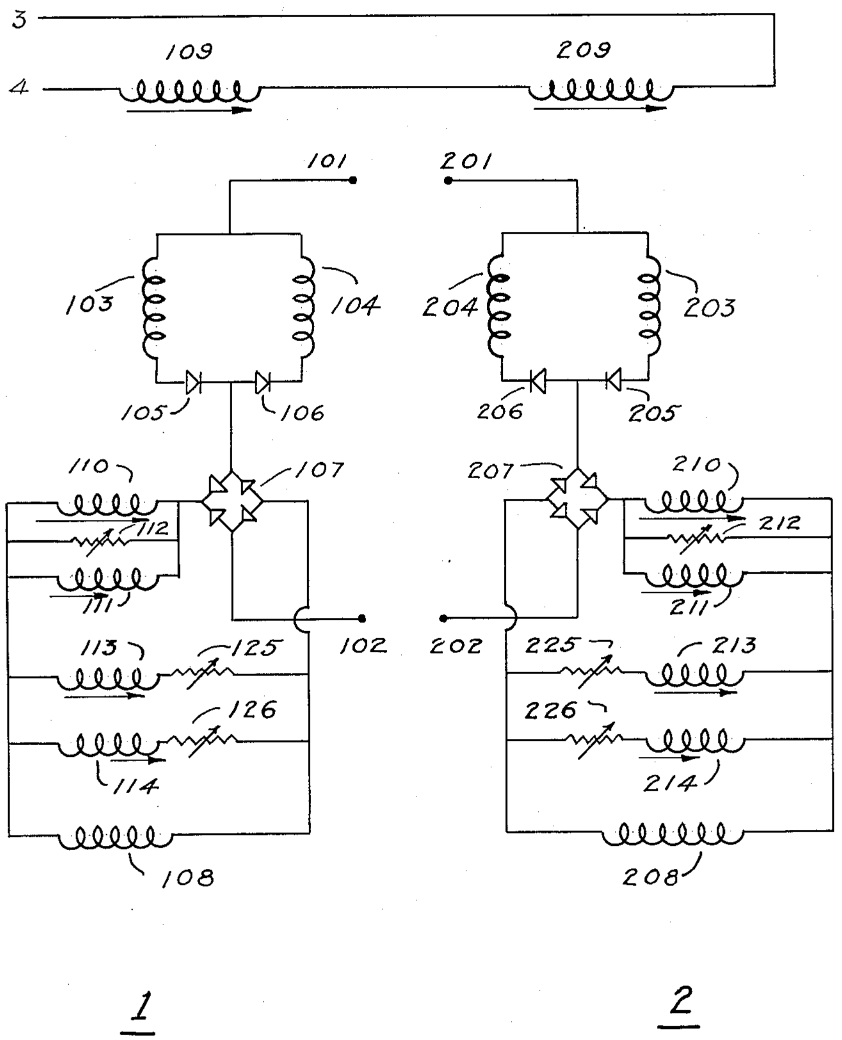

This invention relates to electric amplifier systems and is more particularly concerned with amplifier systems incorporating saturable reactors or transductors, commonly known as magnetic amplifiers.

Such amplifiers have advantages over conventional amplifiers incorporating thermionic valves in that they are considerably more robust. However, magnetic amplifiers in the past have suffered from the disadvantages of comparatively low sensitivity and/or sluggish response. These have been due to the fact that the input to the amplifier consists essentially of a current supplied to a control winding from a voltage source of finite internal resistance. To increase sensitivity it is necessary either to increase the number of turns of the control winding (and hence its inductance) or to apply positive feed-back from the output of the amplifier to the input which again increases the effective input inductance. The time-constant of the input circuit (i. e. its inductance divided by its resistance), which provides a measure of the sluggishness of response of the input, thus tends to be undesirably long if the sensitivity of the amplifier is made large.

In the absence of feed-back in such circuits the current in the output, or power, circuit is not zero for zero input, but has a finite value depending, other factors being equal, mainly upon the permeability of the core material. If positive feedback is applied in a conventional manner to a single stage amplifier of this kind this current is increased by a factor approximately equal to that by which the gain is increased. A standing D. C. flux is thus set up in the core and although the amplifier is thereby made sensitive to change in the sign of the input current, the requirement of a certain gain adjusted by the amount of feed-back involves the acceptance of a certain magnitude of output current in the absence of an input signal. This clearly entails a very serious limitation of the design technique.

It is an object of this invention to provide a magnetic amplifier, the gain, output impedance, and standing flux of which may be readily varied and may readily be caused to assume desired values.

It is a further object of this invention to provide a magnetic amplifier having a high gain for steady signals.

A still further object of the invention is the provision of an amplifier having a short input time constant, and a rapid overall response.

Still another object of the invention lies in the provision of a magnetic amplifier in which the flux in the cores of the amplifier and the gain of the amplifier may be controlled independently of one another.

It is a further object of this invention to provide an improved magnetic amplifier which may be readily employed in motor control circuits.

According to the present invention, an amplifier system of the type referred to comprises a pair of similar magnetic amplifiers adapted to produce direct currents varying in opposite directions from a common datum in accordance with the current applied to their input windings. The amplifier system is characterised by the provision of positive and negative current and voltage feed-back windings, fed in accordance with the voltage and current produced by the amplifiers in a load connected to their outputs. The positive voltage feed-back results in an increase of gain and increase of output impedance, while the positive current feed-back results in increase of gain and decrease of output impedance. The converse results hold for the negative feed-back. Positive feed-back from the output of each amplifier to its own input results in an increase of standing flux in the cores while positive feed-back from the output of each amplifier to the input of the other results in a decrease of standing flux in the cores, the converse results holding for negative feed-back. Therefore according to the invention, by adjustment of the overall amount of feed-back, its type, and its manner of connection (i. e. whether from the output of each amplifier to its own input or that of the other) the gain, output impedance and standing flux in the cores of the separate amplifiers for zero input signal can all be caused to assume desired values.

According to a further feature of the invention an amplifier system of the type referred to is characterised by the provision of further positive feed-back, the said further feed-back lagging with respect to the amplifier system output, whereby the gain of the system for steady signals is increased.

The output of an amplifier system, according to the invention, having an input of short time-constant, may be used to supply the input to a further high-gain magnetic amplifier system of any convenient type, the output impedance of the amplifier system being adjusted to have a large resistive component. By such an arrangement the time-constant of the circuit comprised by the output of the amplifier system and the input to the further amplifier is made small and the overall response of the two amplifiers in cascade, is consequently, rapid.

Overall feed-back from the output of the further amplifier is also conveniently applied to the input of the first amplifier, the overall gain of the two systems in cascade being thereby stabilized at a value determined principally by said overall negative feed-back, the said overall negative feed-back decreasing the time constant of the input to the system and increasing or decreasing the output impedance of the system according as to whether the overall feed-back is in accordance with output current or output voltage.

Figure 2:
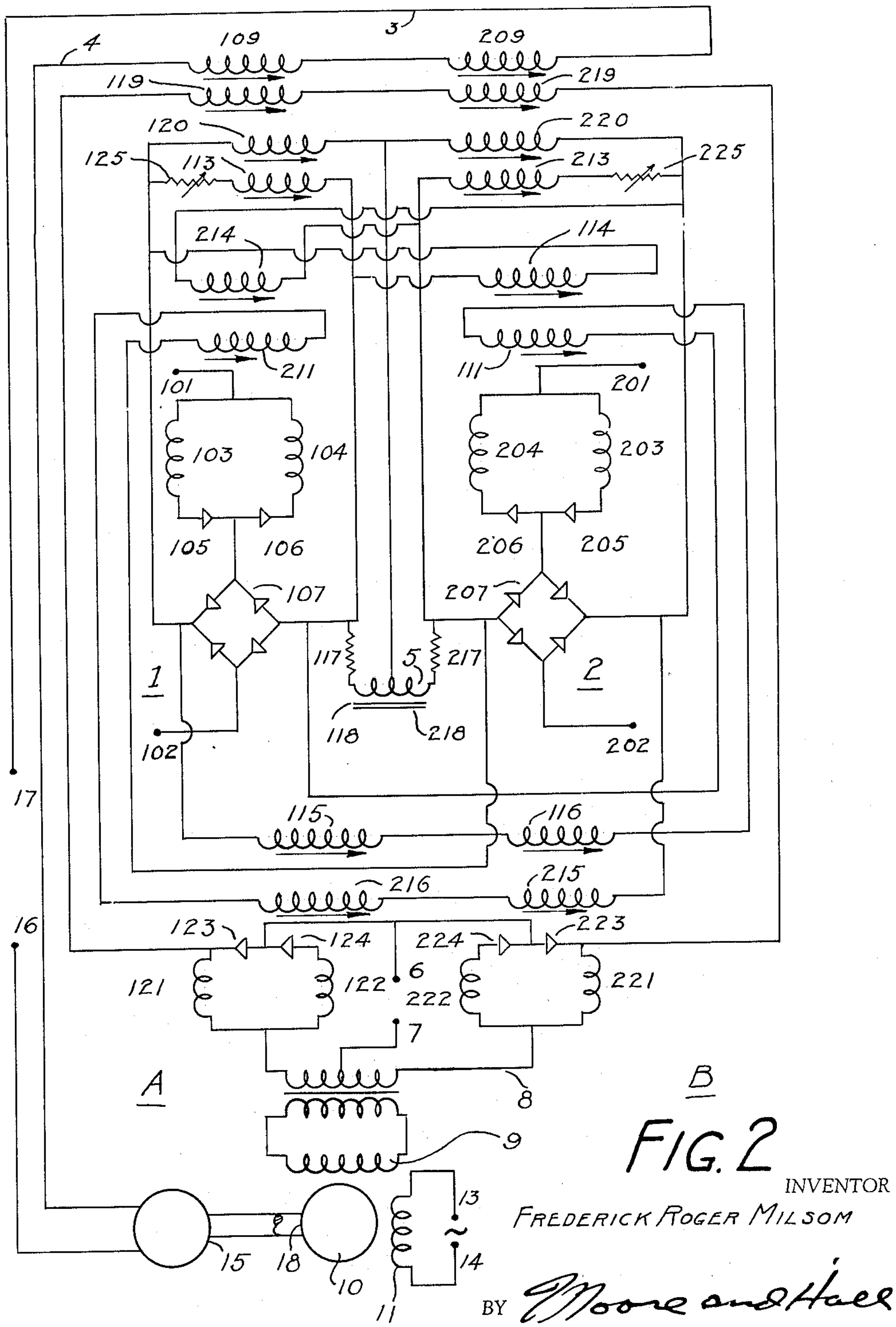

Embodiments of the invention will now be described with respect to the accompanying drawings of which Figure 1 shows in schematic form an amplifier in accordance with the invention, and Figure 2 shows a circuit diagram of an embodiment of the invention, wherein it is used in a system for controlling the speed of a servo motor in accordance with an input signal.

Referring to Figure 1, two similar magnetic amplifiers 1 and 2 are shown. Amplifier 1 comprises a control winding 109 together with two similar power windings 103, 104, carried upon a common high permeability ferromagnetic core (not shown). One terminal of each of windings 103, 104 is connected to a terminal 101 of an A. C. power-supply. The other terminals of these windings are connected through rectifiers 105, 106 respectively to one A. C. input terminal of the rectifier bridge 107. The other A. C. input terminal of bridge 107 is connected to the other terminal 102 of the A. C. power supply. The D. C. output terminals of the bridge are connected, through current feed-back windings 110, 111 and the resistor 112 in parallel, to the load 108. Voltage feed-back windings 113, 114 are connected in parallel with the load 108, variable resistors 125, 126 being connected respectively in series with these windings to enable the feed-back to be adjusted. It will be seen that rectifiers 105, 106 will conduct on alternate half cycles of the supply connected to terminals 101, 102, thus setting up a circulating direct current in windings 103, 104. The sense of connection of these windings is such that a net D. C. flux is produced in the ferromagnetic core.

Amplifier 2 is in all respects similar to amplifier 1, the numbers referring to equivalent components in amplifiers 1 and 2 beginning with the digits 1 and 2 respectively, and the voltages and frequencies of the power supplies to the pairs of terminals 101, 102 and 201, 202 respectively being equal.

The control winding 109, 209 are connected in series to the control current input lines 3, 4. Their sense of connection is such that if a current flowing between these terminals produces a flux in the same direction as that produced in the core of amplifier 1 by the circulating current in windings 103, 104 it will produce a flux in opposition to the corresponding flux in amplifier 2. Such a current will result in an increase in the current taken from the source connected between terminals 101, 102 and a decrease in the current taken from the source connected between terminals 201, 202 in a known manner, the manner of connection of the power windings and their associated rectifiers producing positive current feed-back.

Windings 110 and 113 are carried by the core of amplifier 1, windings 111 and 114 by that of amplifier 2. Similarly windings 210 and 213 are carried by the core of amplifier 2 and windings 211 and 214 by that of amplifier 1. The output of the amplifier is provided by the difference between the direct currents in windings 108 and 208.

The arrangement is completely symmetrical, i. e. if the feedback produced by winding 110 is negative so will be that produced by winding 210.

The arrows adjacent the various windings indicate the relative directions of the fluxes produced thereby when all the feed-back windings are arranged to provide positive feed-back. Should any winding be required to provide negative feed-back the connection of that winding would be reversed and the direction of the corresponding arrows changed.

The effects of variation in the feed-back connections can be most readily appreciated from the following table:

| Type of Feed-back | Sign | Windings used | Effect on Output impedance | Effect on D. C. Flux in Cores | Effect on Gain |
|---|---|---|---|---|---|
| Current | Positive | 110, 210 | Decrease | Increase | Increase. |
| | Negative | 110, 210 | Increase | Decrease | Decrease. |
| | Positive | 111, 211 | Decrease | do | Increase. |
| | Negative | 111, 211 | Increase | Increase | Decrease. |
| Voltage | Positive | 113, 213 | do | do | Increase. |
| | Negative | 113, 213 | Decrease | Decrease | Decrease. |
| | Positive | 114, 214 | Increase | do | Increase. |
| | Negative | 114, 214 | Decrease | Increase | Decrease. |

Thus, it will be seen that if the amplifier system is set up, by adjustment of the amount and direction of feed-back, and by appropriate choice of whether it is from each of the amplifiers to itself or to the other the output impedance, D. C. flux in the cores and gain can be controlled independently of each other. It will be appreciated by those skilled in the art that an amplifier in accordance with the present invention permits considerably greater flexibility of design than is usual in amplifiers of the prior art. It should however be pointed out that it is undesirable to adjust the degree of feedback produced by a given winding by means of adjustable resistors in parallel, as these will tend to increase the time constants and hence decrease the speed of response. However, resistors in series with voltage feed-back windings will be acceptance as they will have the effect, which is usually desirable, of decreasing the time-constants.

It will be realized that in any particular embodiment, it may not be necessary to use all of the feed-back windings. If windings 110, 111 are both omitted, they will of course be replaced by a short circuit.

The embodiment of the invention shown in Figure 2 will now be described, in which it is applied to the control of the speed of a two phase induction motor in accordance with a D. C. signal.

The motor is indicated at 10, and its speed is to be controlled in accordance with the D. C. signal applied between terminals 16 and 17.

Components denoted by the same numbers in Figures 1 and 2 are equivalent.

The input signal applied to lines 3 and 4 consists of the difference between the D. C. signal between terminals 16 and 17 and the output of a tachometric signal generator 15, driven, through a shaft 18, by motor 10 and thus giving a D. C. signal proportional to the speed of motor 10 and of sign depending upon the direction of rotation of motor 10.

The load on amplifier 1 of Figure 2 consists of control windings 115, 116 to further similar magnetic amplifiers A and B connected in series, while the load on amplifier 2 of Figure 2 consists of control windings 215, 216 of amplifiers A and B, windings 115, 116, 215, 216 all being similar.

Windings 113 and 213 are used respectively to apply positive voltage feed-back from the outputs of amplifiers 1 and 2 respectively to their inputs. Variable resistors 125 and 225 in the circuits of amplifiers 1 and 2 respectively are adjusted to produce a balance between amplifiers 1 and 2.

Windings 114 and 214 are used respectively to apply positive voltage feed-back from the output of each of the amplifiers 1 and 2 to the input of the other.

Windings 211 and 111 are used respectively to apply negative current feed-back from the outputs of amplifiers 2 and 1 respectively to the inputs of amplifiers 1 and 2.

Delayed positive voltage feed-back is applied from the output of amplifier 1 to its input through resistor 117, half (118) of the winding of centre tapped inductor 5, and winding 120 (carried by the core of amplifier 1). Corresponding feedback is applied from the output of amplifier 2 to its input over a corresponding path. It will be seen that the D. C. flux in the core of inductor 5 will be proportional to the difference between the output of amplifiers 1 and 2 (in a steady state) so that it can be made considerably smaller than would be necessary if separate inductors were used for the two amplifiers.

It will be seen that the feed-back arrangement is such as to increase the output impedance for short term variations in the input; and in fact, this is made as large as is practically possible, the gain and standing flux in the cores being adjusted to convenient levels by distribution of the feed-back in the manner described earlier. The effect of this is to reduce the time-constant for the transfer from amplifiers 1 and 2 to amplifiers A and B to a very low value.

The delayed positive feed-back from the outputs of amplifiers 1 and 2 to their input results in an increase in the gain of the amplifier for long-period variations of the input current as compared with that for short-period variations. It has the additional advantage that the effect of short-period saturation of the amplifiers A and/or B is counteracted in the long term by storage of the input signal in the feedback circuit.

It has been mentioned earlier that the output of the system comprised by amplifiers 1 and 2 consists of the difference between their output currents. Windings 115 and 216 are therefore coupled to amplifier A, so that the difference between the currents flowing in them constitutes the input for that amplifier while windings 116 and 215 are coupled in an equivalent manner to provide the input for amplifier B.

Amplifiers A and B are similar. Amplifier A comprises, in addition to the control windings 115, 216 already described, power windings 121, 122 upon a common core, together with rectifiers 123, 124 connected in series with one half of the primary of centre-tapped transformer 8 across an A. C. supply connected between terminals 6 and 7. Amplifier B is similar to amplifier A, and feeds the other half of the primary of transformer 8. Components corresponding to 121, 122, 123, 124 in amplifier A are denoted by numbers 221, 222, 223, 224 respectively. Amplifiers A and B function in a similar manner to amplifiers 1 and 2, and are arranged in such a way that for one sense of the output from amplifiers 1 and 2 the impedance produced by the power windings of A increases while that provided by those of B decreases, while for the other sense the reverse is the case.

Overall negative voltage feed-back is provided by connecting windings 119 and 219 (respectively on the cores of amplifiers 1 and 2) in series between the junction of winding 121 and rectifier 123 in amplifier A and the junction of winding 221 and rectifier 223 in amplifier B.

The difference between the currents in the rectifiers 121 and 221 will be proportional to the output of the complete amplifier system so that the potential across windings 119 and 219 will also be proportional to the output.

The negative feed-back thereby produced determines the overall gain of the complete amplifier system in a known manner.

The secondary winding of transformer 8 is connected to one phase-winding 9 of the 2-phase induction motor 10. The second winding 11 of motor 10 is connected to an A. C. supply of the same frequency as that connected to terminals 6 and 7, but in quadrature therewith, at terminals 13, 14.

As mentioned earlier, motor 10 drives D. C. tachometric generator 15 by means of shaft 18. The signal from tachometric generator 15 is connected in opposition to the control signal between terminals 16 and 17 and the connections between the amplifier and motor system are such that the motor runs in such a direction as to reduce the net input signal (between lines 3 and 4) substantially to zero. Thus the angle through which shaft 18 turns will represent substantially the integral with respect to time of the input between terminals 16 and 17. It will be seen that if amplifiers A and/or B become saturated the linear relationship between input signal and output speed will be lost. However, provided that amplifiers 1 and 2 are not saturated and the duration of the saturation of amplifiers A and/or B is not too great the misalignment will be stored in the circuit comprising resistors 117, 217 and inductor 5, so that the overall integration provided by the complete motor-amplifier system will, in the long term, be correct.

It will be appreciated by those skilled in the art that the negative overall voltage feed-back will result in a low source impedance feeding the winding 9 of motor 10, and that this will result in a high degree of damping of the motor, which is of course desirable.

It will be seen that the complete amplifier system as described is completely symmetrical. If however it is necessary to bias the further amplifier comprised by A and B, the requisite bias may readily be obtained by distributing the output windings of the amplifiers 1 and 2 in an asymmetric manner between the inputs of amplifiers A and B.

I claim to have invented:

1. An amplifier system comprising two similar magnetic amplifiers each having an input and an output, a source of current coupled to each of said inputs, said amplifiers each including rectifying means so arranged that that each amplifier produces direct currents which vary respectively in opposite directions from a common datum in response to variations in said source of current, positive voltage feedback means coupled to each of said outputs, positive current feedback means coupled to each of said outputs, negative voltage feed back means coupled to each of said outputs, and negative current feedback means coupled to each of said outputs, means selectively coupling said voltage feedbacks from each of said outputs to both of said inputs, further means selectively coupling said current feedbacks from each of said outputs to both of said inputs, and a further amplifier system having a further input, the outputs of said two similar magnetic amplifiers being coupled to the input of said further amplifier system.

2. The amplifier system of claim 1 in which said further amplifier system has a further output, and a motor field coil coupled to said further output.

3. The amplifier system of claim 2 including a motor coupled to said motor field coil, and variable direct current feedback means responsive to the speed of rotation of said motor coupled to said magnetic amplifiers and to said further amplifier systems.

4. In an amplifier system comprising a pair of similar magnetic amplifiers adapted to produce direct currents in a load circuit varying in opposite directions from a common datum in accordance with a control current applied to their input winding the combination of positive voltage feed-back windings and negative voltage feed-back windings fed with currents proportional to the voltages across the load circuit, positive current feed-back windings fed with currents proportional to the currents in the load circuit, said feed-back windings being so distributed between the amplifiers as to produce desired values of gain, output impedance and standing flux in the amplifier cores for zero input signal, and means to apply further lagging feedback from the output to the input of the system, to increase the gain of the system for steady input signals as compared with its gain for fluctuating input signals, said last-named means comprising a resistor and an inductor in series with appropriate amplifier input windings.

References Cited in the file of this patent

UNITED STATES PATENTS

| | | |
|---|---|---|
| 2,338,423 | Geyger | Jan. 4, 1944 |
| 2,464,639 | Fitzgerald | Mar. 15, 1949 |
| 2,475,575 | Tweedy | July 5, 1949 |
| 2,477,990 | Lamm | Aug. 2, 1949 |
| 2,552,952 | Gachet | May 15, 1951 |

OTHER REFERENCES

Saturating Core Devices (Crow), published by Edwards Brothers, Inc., Ann Arbor, Michigan, Oct. 3, 1949 (pp. 283–288 relied on).

AIEE Miscellaneous Paper 50–93, December 2, 1949 (Fig. 32 relied on).